Patented Dec. 6, 1927.

1,651,709

UNITED STATES PATENT OFFICE.

JESSE L. JONES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SOLDER.

No Drawing.   Application filed June 30, 1921.  Serial No. 481,613.

This invention relates to solders, more particularly to a brazing solder adapted for various uses including brazing rotor bars to end rings to form the rotors of induction motors.

Hitherto, in applications of this kind, the various elements were brazed by means of the ordinary brazing solder which consisted generally of copper and zinc in equal proportions. This solder, commonly known as hard solder, has a relatively high melting point, considerably over 1000° C. When heated to the high temperature necessary to melt the solder, a considerable proportion of the zinc volatilizes and oxidizes to form a film of zinc oxide on the material being brazed which tends to impair the efficiency of the joint.

Since the melting point of the solder is high, it is necessary to heat the material, generally by means of a gas flame, to a temperature above 1000° C. and generally in the neighborhood of 1100° C. for a considerable length of time. The long period of contact of the copper forming the elements of a rotor with the hydrocarbon gases causes considerable hydrogenation of the copper due to the absorption of hydrogen from the flame into the interior of the copper bars and rings. The high temperature and the long period of heating may also cause material warping of the finished rotor, necessitating a machining operation in order to restore the same to the proper form.

The present invention is designed to provide an improved solder, it being among the objects thereof to provide a brazing solder which shall have a low melting point, which shall be hard, tough and strong, which shall not oxidize and which shall have a high degree of fluidity in order to penetrate between the surfaces to be brazed.

In practising my invention, I provide an alloy of copper and phosphorus, usually containing less than 10% of phosphorus. I have found that such low-phosphorus copper alloys, more specifically the eutectic alloy which melts at about 707° C. and contains about 8.27% of phosphorus, are especially suitable for brazing copper or copper alloys. This material is hard, tough, and strong, has a relatively low melting point and is capable of flowing freely into cracks and joints to be brazed.

A specific application of this solder is as follows: In brazing rotor bars to end rings to form the rotors of induction motors, the end rings are formed with annular grooves, and a series of holes are punched therein. Rotor bars are inserted in said holes and pieces of solder placed in the grooves. A single flame, usually an acetylene torch, is directed on the annular groove containing the phosphorus copper alloy which preferably contains 6 to 9% phosphorus, quickly melting the same and causing it to flow into the spaces between the bars and end rings. On account of its fluidity, the solder fills all the crevices to form an efficient joint, both mechanically and electrically.

Since the melting of the alloy may be accomplished by a single flame or blow-torch, the danger of warping the rotor by heat is practically avoided. In using the ordinary copper-zinc solder, it is necessary to provide a furnace having a series of burners directed upon the rings which are rotated in order to uniformly heat the same. By utilizing my new solder, the necessity for such a furnace is eliminated, since a single hand torch is all that is necessary to braze the material. Because of the much lower temperature of brazing, a considerable saving is effected in the cost of fuel.

When brazing copper with the new solder, no flux is necessary but when brazing brass, it is desirable to use a flux of borax and microcosmic salt or similar material in order to neutralize the effect of zinc oxide which is formed during the brazing operation.

Although I have described specifically the use of my phosphorus-copper brazing solder for forming rotors of induction motors, it is obvious that this is but one of the numerous applications for my new material. For instance, I may braze the copper resistor bars used in immersion-type heaters, thus providing a material which does not corrode in water and other liquids. Various percentages of phosphorus in the alloy may be utilized but, preferably, I restrict myself to an alloy containing 10% or less phosphorus.

I claim as my invention:

1. A brazing solder which consists of an alloy of substantially 6 to 10% phosphorus and the remainder copper.

2. A brazing solder having a melting point between 700° and 900° C. containing phosphorus and copper as the main and essential constituents thereof.

3. A brazing solder having a melting point between 700° and 900° C. consisting of phosphorus and copper.

4. A solder comprising copper and phosphorus as the main and essential constituents thereof, the ratio of copper to phosphorus in said solder being greater than 4 to 1.

5. A method of uniting objects of copper which comprises placing an alloy containing copper and 6 to 9% of phosphorus therebetween and heating said objects to a temperature sufficient to form alloys of copper and phosphorus with said objects.

6. A method of uniting objects of copper alloys which comprises placing an alloy containing copper and 6 to 9% of phosphorus therebetween and heating said objects to a temperature sufficient to form alloys of copper and phosphorus with said objects.

In testimony whereof, I have hereunto subscribed my name this 22nd day of June, 1921.

JESSE L. JONES.